US012745184B2

(12) United States Patent
Ickin et al.

(10) Patent No.: US 12,745,184 B2
(45) Date of Patent: Sep. 22, 2026

(54) GRAPH-BASED SYSTEMS AND METHODS FOR CONTROLLING POWER SWITCHING OF COMPONENTS

(71) Applicant: Telefonaktiebolaget LM Ericsson (publ), Stockholm (SE)

(72) Inventors: Selim Ickin, Stocksund (SE); Oleg Gorbatov, Luleå (SE); Daniel Lindström, Luleå (SE); Adam Bergkvist, Luleå (SE); Rafia Inam, Västerås (SE); Lackis Eleftheriadis, Valbo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 501 days.

(21) Appl. No.: 18/027,482

(22) PCT Filed: Sep. 22, 2020

(86) PCT No.: PCT/EP2020/076411
§ 371 (c)(1),
(2) Date: Mar. 21, 2023

(87) PCT Pub. No.: WO2022/063391
PCT Pub. Date: Mar. 31, 2022

(65) Prior Publication Data

US 2023/0403652 A1 Dec. 14, 2023

(51) Int. Cl.
*H04W 52/02* (2009.01)

(52) U.S. Cl.
CPC ... *H04W 52/0274* (2013.01); *H04W 52/0264* (2013.01)

(58) Field of Classification Search
CPC ......... H04W 52/0254; H04W 52/0264; H04W 52/0274; Y02D 30/70
See application file for complete search history.

(56) References Cited

U.S. PATENT DOCUMENTS

2008/0075280 A1* 3/2008 Ye ....................... H04W 12/041 380/28
2022/0264185 A1* 8/2022 Zhou ..................... G06F 21/554
(Continued)

FOREIGN PATENT DOCUMENTS

| | | | |
|---|---|---|---|
| CN | 108696880 | A | 10/2018 |
| CN | 110167054 | A | 8/2019 |
| WO | 2019149350 | A1 | 8/2019 |

OTHER PUBLICATIONS

International Search Report and Written Opinion of the International Searching Authority, PCT/EP2020/076411, mailed Jun. 16, 2021, 15 pages.

*Primary Examiner* — Mansour Oveissi
(74) *Attorney, Agent, or Firm* — Sage Patent Group

(57) ABSTRACT

A computer implemented method of managing power control in a communication system includes generating a graph representation of interdependencies of components of the communication system, wherein the graph representation includes graph nodes corresponding to the components of the communication system and edges between pairs of graph nodes representing dependency relationships between the pairs of nodes. The method generates edge weights for the edges of the graph representation that correspond to the relative importance of the dependency relationship represented by the edge weight, and generates a policy for managing power control by determining an order for switching the components of the communication system on or off based on the edge weights.

18 Claims, 18 Drawing Sheets

(56) References Cited

U.S. PATENT DOCUMENTS

2023/0074995 A1* 3/2023 Lee ............................ H02J 3/50
2024/0259252 A1* 8/2024 Scott ................... H04L 41/0613

* cited by examiner

| | | 0 | 2 | 7 | 10 | |
|---|---|---|---|---|---|---|
| | | Destination | | | | Sum |
| 0 | | 0 | $W_{0,2}$ | $W_{0,7}$ | 0 | 2 |
| 2 | | 0 | 0 | 0 | 0 | 0 |
| 7 | | 0 | 0 | 0 | $W_{7,10}$ | 1 |
| 10 | Source | 0 | 0 | 0 | 0 | 0 |

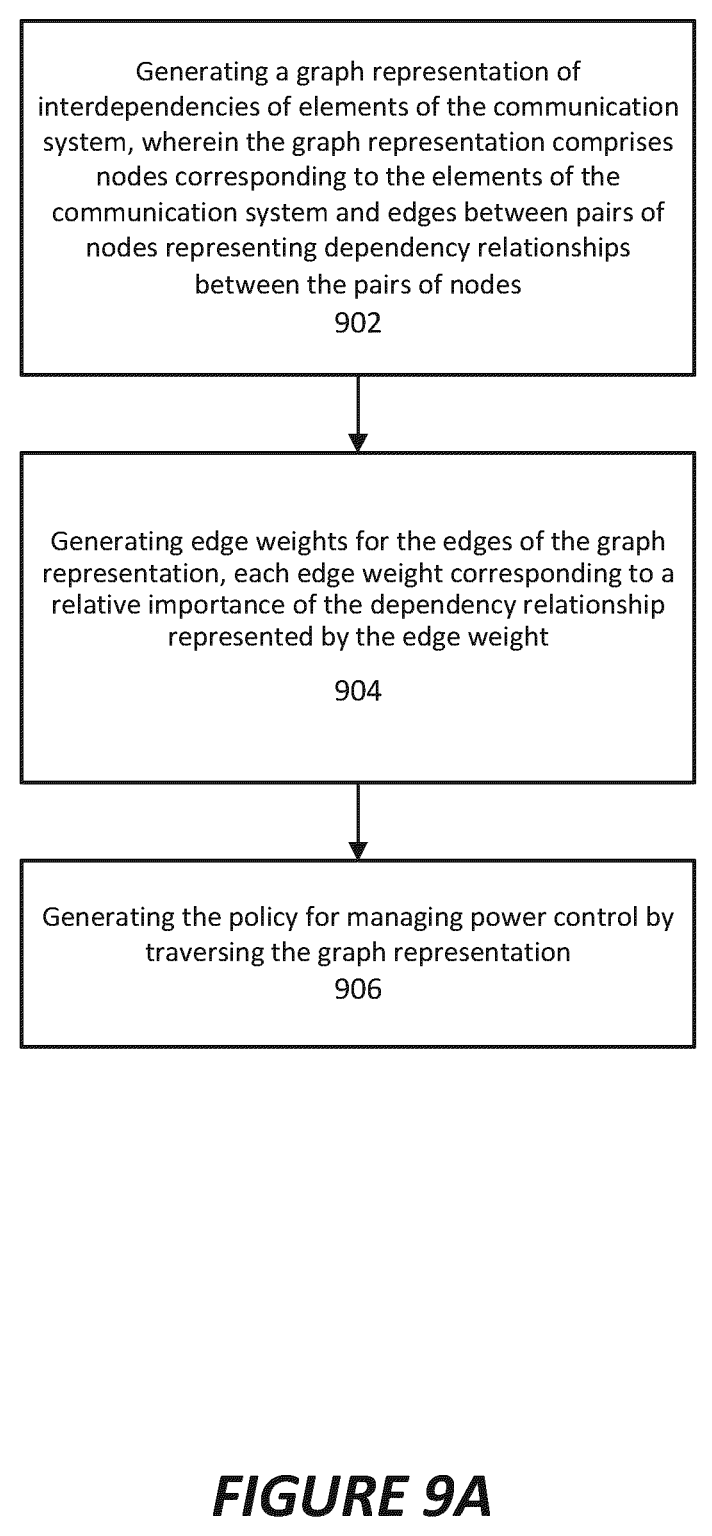

Generating a graph representation of interdependencies of elements of the communication system, wherein the graph representation comprises nodes corresponding to the elements of the communication system and edges between pairs of nodes representing dependency relationships between the pairs of nodes
902

Generating edge weights for the edges of the graph representation, each edge weight corresponding to a relative importance of the dependency relationship represented by the edge weight
904

Generating the policy for managing power control by traversing the graph representation
906

FIGURE 9A

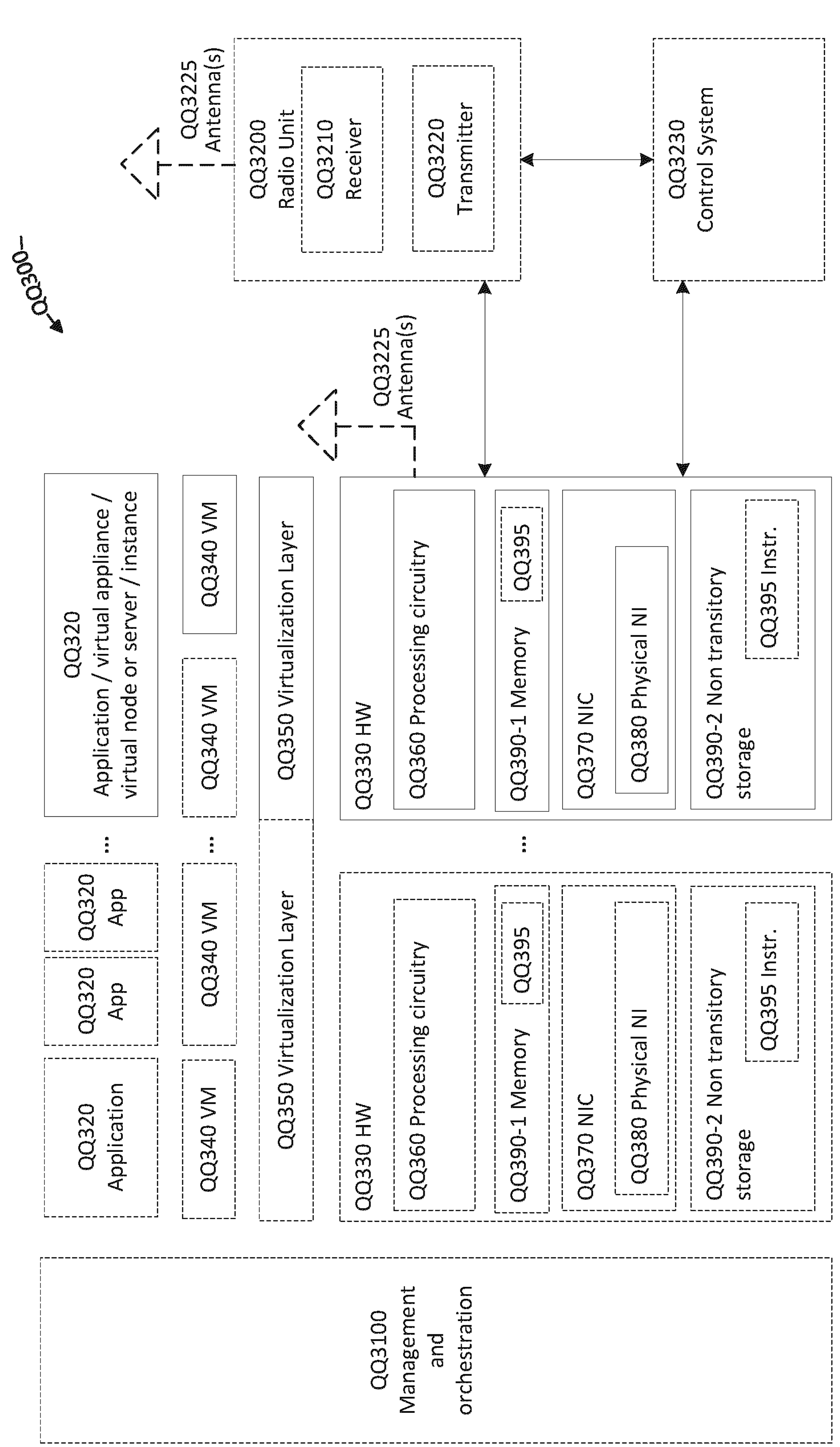
FIGURE 13
QQ300
QQ3225
Antenna(s)
QQ3200
Radio Unit
QQ3210
Receiver
QQ3220
Transmitter
QQ3230
Control System
QQ3225
Antenna(s)
QQ320
Application / virtual appliance / virtual node or server / instance
QQ340 VM
QQ340 VM
QQ350 Virtualization Layer
QQ330 HW
QQ360 Processing circuitry
QQ390-1 Memory
QQ395
QQ370 NIC
QQ380 Physical NI
QQ390-2 Non transitory storage
QQ395 Instr.
QQ320
App
QQ320
App
QQ320
Application
QQ340 VM
QQ340 VM
QQ350 Virtualization Layer
QQ330 HW
QQ360 Processing circuitry
QQ390-1 Memory
QQ395
QQ370 NIC
QQ380 Physical NI
QQ390-2 Non transitory storage
QQ395 Instr.
QQ3100
Management
and
orchestration

GRAPH-BASED SYSTEMS AND METHODS FOR CONTROLLING POWER SWITCHING OF COMPONENTS

CROSS REFERENCE TO RELATED APPLICATIONS

This application is a 35 U.S.C. § 371 national stage application of PCT International Application No. PCT/EP2020/076411 filed on Sep. 22, 2020, the disclosure and content of which is incorporated by reference herein in its entirety.

TECHNICAL FIELD

Inventive concepts described herein relate to communication networks, and in particular to machine learning systems for training control systems for controlling wireless communication networks.

BACKGROUND

Reinforcement Learning (RL) is a data-driven approach of learning an optimal control policy. RL algorithms can learn effective policies without any explicit knowledge of the system or environment through interaction with the environment.

In general, RL algorithms can generally be classified as model-based or model-free. Within the model-free category, RL algorithms can be classified as policy optimization or Q-learning algorithms. Policy optimization algorithms may be suitable for control of many types of complex systems.

The performance of the components of a communication network, such as base stations, sites, cells, and sectors are often maintained and controlled via the Operations Support System (OSS). There are typically multiple components on each site whose functionality and operation depend on each other.

Further, this dependency could be different based on different sites. A simple example of the components of a radio base station installation is illustrated in FIG. 1. As shown therein, the radio base station installation may include one or more power supply units (PSU) that receives power from an AC grid, and a power distribution unit (PDU) connected to the PSU that distributes power to a baseband processor, a beamforming unit (BFU), and one or more radios. In this example, a battery is connected to the PDU through BFU.

The radio base station further includes a climate control unit that receives power directly from the PSU, and cooler/heater component connected to the climate control unit. If not part of the cabinet climate component itself, the cooler/heater may be connected directly to AC grid for its power needs. The PDU and the climate control unit are therefore dependent on the operation of the PSU, and the baseband processor, the BFU, the radio units and the battery are all dependent on the operation of the PDU. In addition, there can be inter-dependencies in the operation in between the radio units as well.

SUMMARY

The equipment in a radio base station is typically monitored and controlled during operation to ensure that it is functioning. One potential and important aspect of equipment control/monitoring is to control the supply of power to the network elements, which may consume varying amounts of power. However, switching elements off may affect the end-user Quality of Experience (QoE). Thus, the timing and order of switching ON/OFF of the network elements should be coordinated to ensure that the end-user QoE is not impaired in the short term, and that long-term problems, such as hardware failures, are not caused by excessive or poorly timed ON/OFF cycling of equipment. In the short term, switching "OFF" the components in the wrong order can increase the energy consumption and impair the network performance, thus leading to a degraded QoE.

A computer implemented method of managing power control in a communication system includes generating a graph representation of interdependencies of components of the communication system. The graph representation includes graph nodes corresponding to the components of the communication system and edges between pairs of graph nodes representing dependency relationships between the pairs of graph nodes. The method further includes generating edge weights for the edges of the graph representation. An edge weight corresponds to a relative importance of the dependency relationship represented by the edge. The method further includes generating a policy for managing power control by determining an order for switching components represented by the graph nodes on or off based on the edge weights. The interdependencies include power switching interdependencies.

Determining the order for switching components represented by the graph nodes on or off may include, for a graph node in the graph representation, generating a sum of edge weights of edges connected to the graph node, selecting graph nodes with a smallest sum of edge weights, removing selected graph nodes from the graph representation, and updating the policy for managing power control with the selected graph nodes.

In some embodiments, determining the order for switching components represented by the graph nodes on or off includes repeating steps of: for a graph node in the graph representation, generating a sum of edge weights of edges connected to the graph node, selecting graph nodes with a smallest sum of edge weights, removing selected graph nodes from the graph representation, and updating the policy for managing power control with the selected graph nodes, until all graph nodes have been removed from the graph.

In some embodiments, the edge weights are generated based on one or more of on-to-off switching duration, off-to-on switching duration, power consumption during on-to-off transition, power consumption during off-to-on transition, power consumption during active state, network element priority and physical location.

In some embodiments, the edge weights are generated by evaluating a cost function that minimizes an energy consumption metric. In some embodiments, the edge weights are generated by evaluating the cost function that minimizes the energy consumption metric while maintaining a quality of service, QoS, metric above a predetermined threshold.

In some embodiments, the edge weights are generated by evaluating a cost function that maximizes a quality of service, QoS, metric. In some embodiments, the edge weights are generated evaluating the cost function that maximizes the QoS metric while maintaining an energy consumption metric below a predetermined threshold.

In some embodiments, the QoS metric is based on one or more of a service level agreement, a number of active user devices in the communication system, a number of active connections in the communication system, a throughput in the communication system, a number of handovers in the communication system, a number of dropped calls in the communication system, and a number of dropped packets in the communication system.

In some embodiments, the edge weights are generated using a reinforcement learning system that measures a reward and a system state in response to operation of a policy for managing power control and adjusts the edge weights in response to the reward the system state. The reward may correspond to an energy saving in the communication system or a Quality of Service, QoS, improvement of the communication system.

In some embodiments, the edge weights are generated the edge weights are selected based on maximizing a sum of the rewards received in response to operation of the policy for managing power control.

The method may further include controlling the communication system in accordance with the policy for managing power control. Controlling the communication system may include switching components of the system on or off in accordance with the policy.

The communication system may include a wireless communication system. The components of the communication system comprise one or more communication equipment, base stations, base station components, cells, sites, switches, antennas, processors, and radios.

Some embodiments provide a server including a processing circuit and a memory coupled to the processing circuit and comprising computer readable program instructions that, when executed by the processing circuit, cause the server to perform operations of generating a graph representation of interdependencies of components of the communication system. The graph representation includes graph nodes corresponding to the components of the communication system and edges between pairs of graph nodes representing dependency relationships between the pairs of graph nodes. The operations include generating edge weights for the edges of the graph representation. An edge weight corresponds to a relative importance of the dependency relationship represented by the edge. The server generates a policy for managing power control by determining an order for switching components represented by the graph nodes on or off based on the edge weights.

Some embodiments provide a server that generates a graph representation of interdependencies of components of the communication system. The graph representation includes graph nodes corresponding to the components of the communication system and edges between pairs of graph nodes representing dependency relationships between the pairs of graph nodes. The server generates edge weights for the edges of the graph representation. The edge weights correspond to relative importance of the dependency relationship represented by the edges. The server generates a policy for managing power control by determining an order for switching components represented by the graph nodes on or off based on the edge weights.

BRIEF DESCRIPTION OF THE DRAWINGS

FIGS. 9A and 9B illustrate operations for generating a policy for managing power control of elements of a communications system according to some embodiments.

FIG. 13 is a block diagram of a virtualization environment in accordance with some embodiments.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

As noted above, communication systems are highly complex, with many inter-dependencies among system components.

Figure 2:
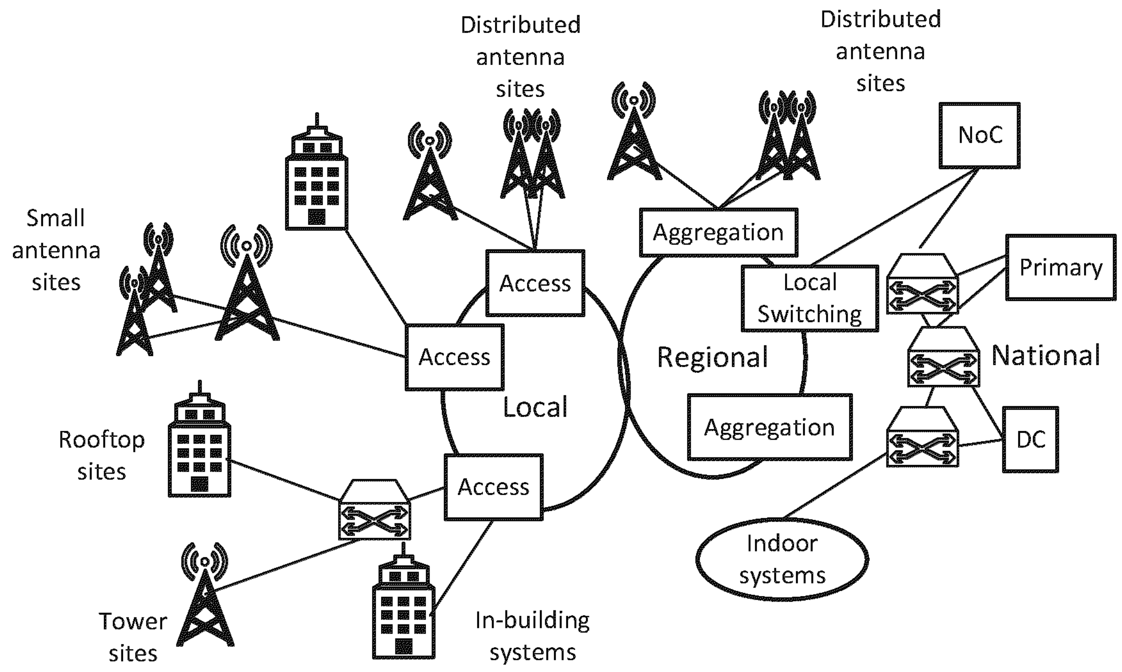
FIG. 2 illustrates elements of a communication system.

This complexity of inter-dependencies increases as the hierarchy of a network is considered. For example, an example of potential inter-dependencies among multiple network elements in a large communication network is depicted in FIG. 2. As shown in FIG. 2, a communication network may include a local access network to which multiple sites, such as building sites, rooftop sites, small antenna sites, distributed antenna sites, tower sites, in-building systems, etc. are connected, a regional access network that includes aggregation nodes that connect local sites, and a national access network that connects data centers (DC) and network operation centers (NoC) to the regional and local access networks. Each of these sites may include multiple different types of equipment, such as base stations, switches, gateways, servers, etc., which are all interconnected and may or may not be interdependent.

Currently, switching "OFF" of network elements is done according to manual fixed procedures, such as daily schedules in the OSS that apply fixed policies. Such policies may be suboptimal due to the complex inter-dependencies of many different components in a system, which can influence both the energy consumption and hardware lifetime of the products.

Accordingly, some embodiments described herein provide automated systems/methods for generating a policy for controlling the ON/OFF switching of network elements. To achieve this, a representation is presented that stores/records inter-dependencies in a network and that generates a system/algorithm according to which the ON/OFF process may be automated.

According to some embodiments, systems/methods are provided for that control the ON/OFF switching of network components that may reduce/minimize energy consumption by extending the total OFF duration of all components to maximize energy saving and/or that increase/maximize QoE. That is, achieving the goal of extending OFF time above should not adversely impact the QoE. Accordingly, some embodiments are configured to sustain a given Service Level Agreement (SLA) as defined according to Key Performance Indicators (KPI). In some embodiments, the QoE, which may be expressed as a function of KPIs and performance metric (PM) counters, may be estimated by calculating an estimated Mean Opinion Score (MOS).

Another goal of the control policy generated according to some embodiments is that the lifetime of the device should be sustained. That is, by reducing/preventing too-frequent power cycling, the lifetime of the equipment may be sustained or extended.

Accordingly, some embodiments have as a goal to maximize the value of expression [1] below, where $N_L$ is a number of ON-to-OFF or OFF-to-ON state transitions in a given time interval, L, TOFF is the maximum OFF time permitted under the applicable SLA, and MOS_SLA is the minimum MOS permitted under the applicable SLA.

$$\text{Max}[(\text{TOFF}*\text{MOSestimated})/\text{NL}]: \quad \text{TOFF}<\text{TOFF\_SLA}, \text{MOS}>\text{MOS-SLA} \qquad [1]$$

Systems/methods according to some embodiments may learn and quantify inter-dependencies among system components and store such information in the form of graph. A graph-based approach as described herein may lead to new understanding of and insights into the communication system interdependencies.

Some embodiments may improve the efficiency of operation of one or more elements, sites or parts of a communication network by improving resource utilization and/or saving energy and power without sacrificing quality of service. Some embodiments may result in increased component lifetime resulting from better utilization patterns and avoiding unnecessary "on" periods and/or on/off switching of components. Accordingly, some embodiments may save energy costs, and/or may reduce carbon-footprint of network equipment, such as base stations, which may reduce the environment impact.

Figure 3:
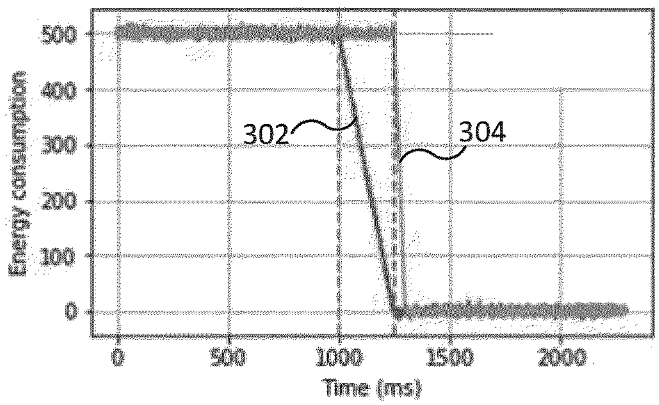
FIG. 3 illustrates an example of energy consumption of two components during OFF switching.

FIG. 3 illustrates energy consumption of two components during OFF switching. Curve 302 illustrates energy consumption as a function of time of a first component (Component A), while curve 304 illustrates energy consumption as a function of time of a second component (Component B). The second component (Component B) is switched off after the first component (Component A). Component A's switching off time is around 250 ms, while component B's switching off time is significantly shorter. Component B stays active for 250 ms (during component A's transition from ON state to OFF state) and consumes/wastes energy. If there are multiple other components such as Component B that are switched OFF after component A is completely OFF, the energy waste would increase accordingly (linearly).

Hence, in some embodiments, this waste of energy due to suboptimal switching OFF sequence may be learned and captured via a machine learning model. For example, the systems/methods may learn a policy for switching off the two components described in FIG. 3 in such a way as to reduce/minimize energy consumption. If they can be switched OFF in parallel, switching them OFF simultaneously can be suggested. If not, and if the switching OFF process needs to be sequential, then it might be better to switch OFF component B earlier. In the switching ON scenario, it might be recommended to switch ON components with slower switch ON duration first, since it may be better for fast-switching components not to wait (for operation) for the slow one at an active state. Although the dependency illustrated in FIG. 3 is simple, the system may become significantly more complicated when more components are involved.

Graph Representation

Due to the possibly complex inter-dependency and strong relationship in between different components, one way to represent the relationship between components is via a graph method. A graph is a set of graph nodes that are connected in between each other with directed or undirected edges. The connections in between the graph nodes show the inter-dependency of the components represented by the graph nodes.

In this disclosure, each controllable element of a communication network, such as a cell, electronic component, or network element is represented in the form of a node on a graph (referred to herein as a "graph node" as distinguished from a physical node of a communication network). Rudimentary hardware components within a site (e.g., power supplies, cooling units, etc.) may also be represented by graph nodes, and the inter-dependency between graph nodes is depicted with directed edges, where the arrow direction points toward the dependent component/graph node.

The graph can be constructed by using a statistical adjacency matrix by looking at the "traffic" or interactions in between the components represented by the graph nodes. If the components are base stations, one can look at the network traffic in between. If the components are hardware components/units in the site, starting from radio unit, and one can look at either the radio Printed Circuit Board (PCB) design as it segmented, to addresses number of TX ports to be turned "OFF" (e.g. including also interface id's to the TX ports) on the radio hardware equipment.

The graph may be constructed by generating an N×N matrix in which the first column is the source node, and the second column is the destination element relative to the source node. N is the number of directed edges.

Figure 1:
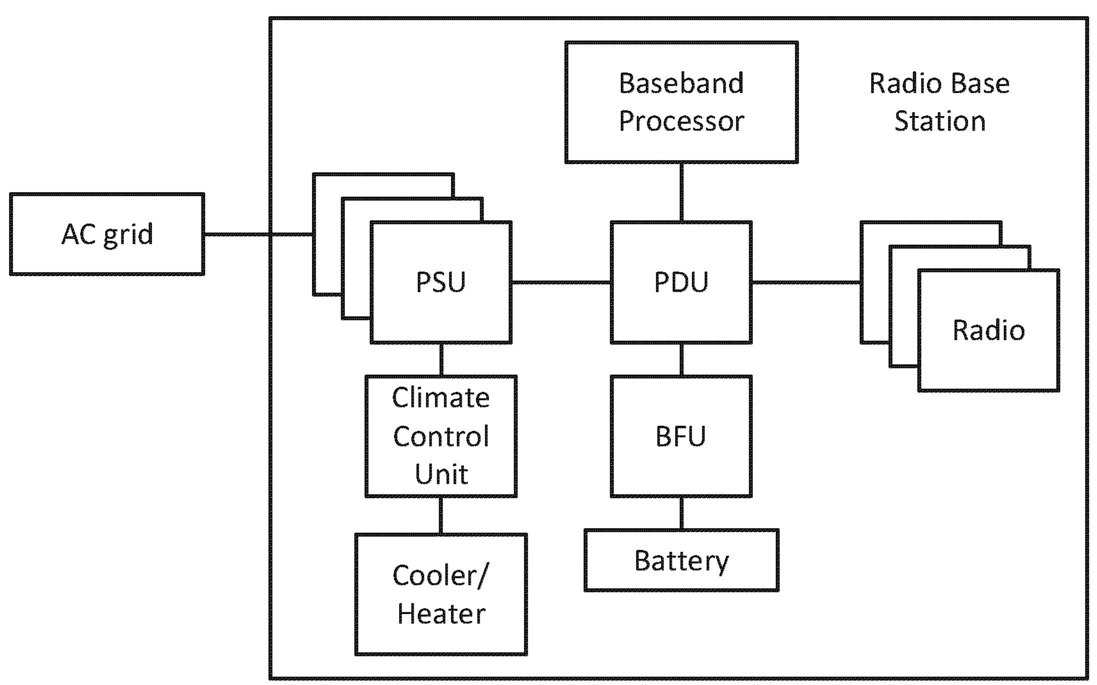
FIG. 1 illustrates components of a radio base station.
Figure 4:
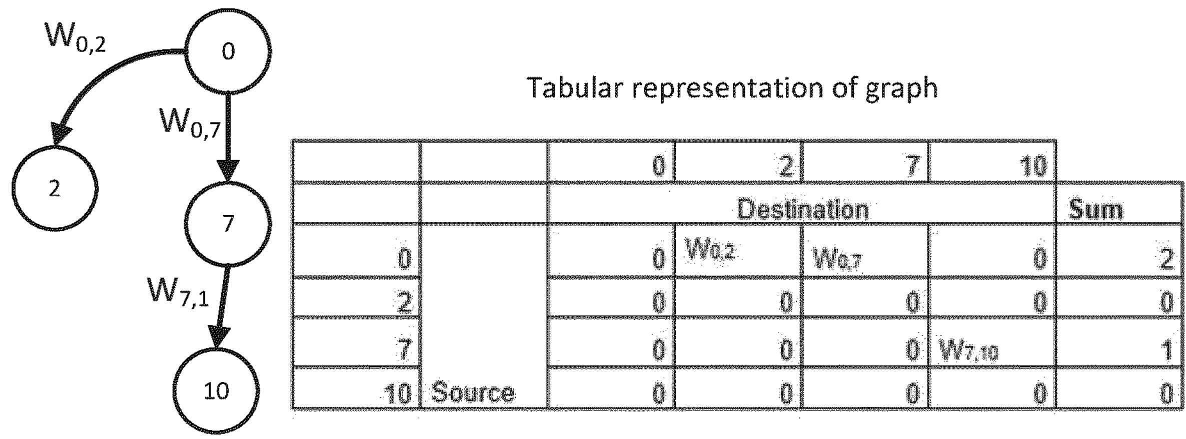
FIG. 4 illustrates an example graph representation including graph nodes and edges between graph nodes.

An example graph is illustrated in FIG. 4 along with its tabular representation. The graph includes four graph nodes, each of which is labeled with a number corresponding component it represents. That is, the numbers on graph nodes represent different components or network elements. In this example, Graph Node 10 represents a radio unit, Graph Node 7 represents a Power Distribution Unit (PDU), Graph Node 2 represents a Power Supply Unit (PSU), and Graph Node 0 represents the AC grid shown in FIG. 1. An arrow between graph nodes represents an edge that point towards a destination graph node, where the destination node depends on the graph source node. If an arrow points toward both graph nodes, then both the source and destination graph nodes depend on each other. In the graph, a leaf node is a graph node on which no other graph nodes depend (i.e., have no destination graph nodes).

The table in FIG. 4 illustrates the graphical representation in a 2D matrix, where source nodes are listed as rows, and the destination graph nodes as columns. In the above example, the leaf nodes 2 and 10 have no destination graph nodes. Their row-wise sum is zero, hence no other nodes graph depend on these graph nodes. For simplicity in presentation, the sum is shown as the count of non-zero values for a given source row.

According to some embodiments, each edge may be assigned one or more weights ($W_{x,y}$). A weight indicates an aspect of the dependency between the components represented by the graph nodes (with X as the source node and Y as the destination graph node), such as the importance of the dependency relative to other dependencies.

In the table shown in FIG. 4, each weight $W_{x,y}$ is assumed to be equal to one or zero. However, other weights may be assigned based on training as described in more detail below.

Graph Processing

Once a graph has been defined that describes the relationships between each component, a switching procedure, such as a switching OFF procedure or a switching ON procedure may be defined. The procedure may define the order and/or timing of switching ON or OFF of components in the system. Such a procedure may indicate that the leaf nodes should be prioritized when being switched "OFF" (e.g., switched off first). After every step, the table is updated while converting the corresponding weights of the elements that are switched off. At each step, a sum of weights is calculated for each source node, and the graph node having the lowest sum of weights as a source may be switched off. When a node is switched off, the remaining weights are re-calculated and the graph node is removed from the table. An example procedure is listed as follows:

1. Switch OFF sources 2 and 10 since both have a row-wise sum of 0. That is, argmin(SUMweights_source)=0.
2. After updating $W_{0,2}$ and $W_{7,10}$ to 0 (since graph nodes 2 and 10 are now switched OFF), source node 7 has a row-wise sum of 0 and can be turned OFF next.
3. Finally, after updating $W_{0,7}$ to 0, source node 0 has a row-wise sum of 0 and can be turned OFF.

In a generalized form, a pseudocode algorithm for the generated procedure is:

```
while source_list.sum(axis=1)>:# In the above example,
    source_list=[2,0,1,0] switch-off (argmin(SUMweights_source)) # in non-cyclic, min(source_list) is 0.
source_list.remove(argmin(SUMweights_source)))
```

Once the edge weights have been generated, the policy may be used to turn a particular component of a communication system off by considering only the components of the communication system that are "downstream" from the particular component (i.e., that depend on the particular component directly or indirectly through intermediate components). A subgraph including only those components may be traversed to determine an optimal order for turning off dependent components until the particular component is turned off. Likewise, the policy may be used to turn a particular component on by considering only the components that are "upstream" from the particular component (i.e., on which the particular component depends directly or indirectly through intermediate components). A subgraph including only those components may be traversed to determine an optimal order for turning on components until the particular component is turned on.

Figure 5A:
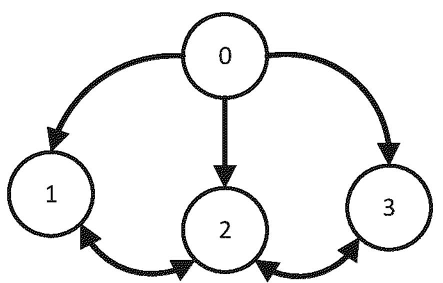
FIGS. 5A and 5B illustrate graph representations of components of a communication system according to some embodiments.

Machine Learning approach:

The graph shown in FIG. 4 is non-cyclic, so the graph includes leaf nodes. On the other hand, some graphs can be cyclic, meaning that no leaf nodes exist as shown, for example, in the graph shown in FIG. 5A. That is, in the graph shown in FIG. 5A, every graph node is a source node with an associated destination graph node.

When a graph is cyclic, deciding on which component to start switching OFF may be difficult. Hence, it may be non-trivial to decide which component to switch ON or OFF first due to the inter-dependencies. For example, switching ON/OFF time for graph node 2 might be significantly higher and energy consuming as compared to graph nodes 1 and 3. Thus, it might be preferable to switch off graph nodes 1 and 3, earlier if there is no dependency. In a network base station, switching OFF some small cells may be easier and less impactful on QoE as compared to switching OFF larger sites that are inter-dependent on others. Hence, there are extra observations that need to be considered such as energy consumption, the time it takes a component to switch ON and OFF, etc. Therefore, an optimal waiting time in between the switching OFF events need to be computed as well.

Figure 5B:
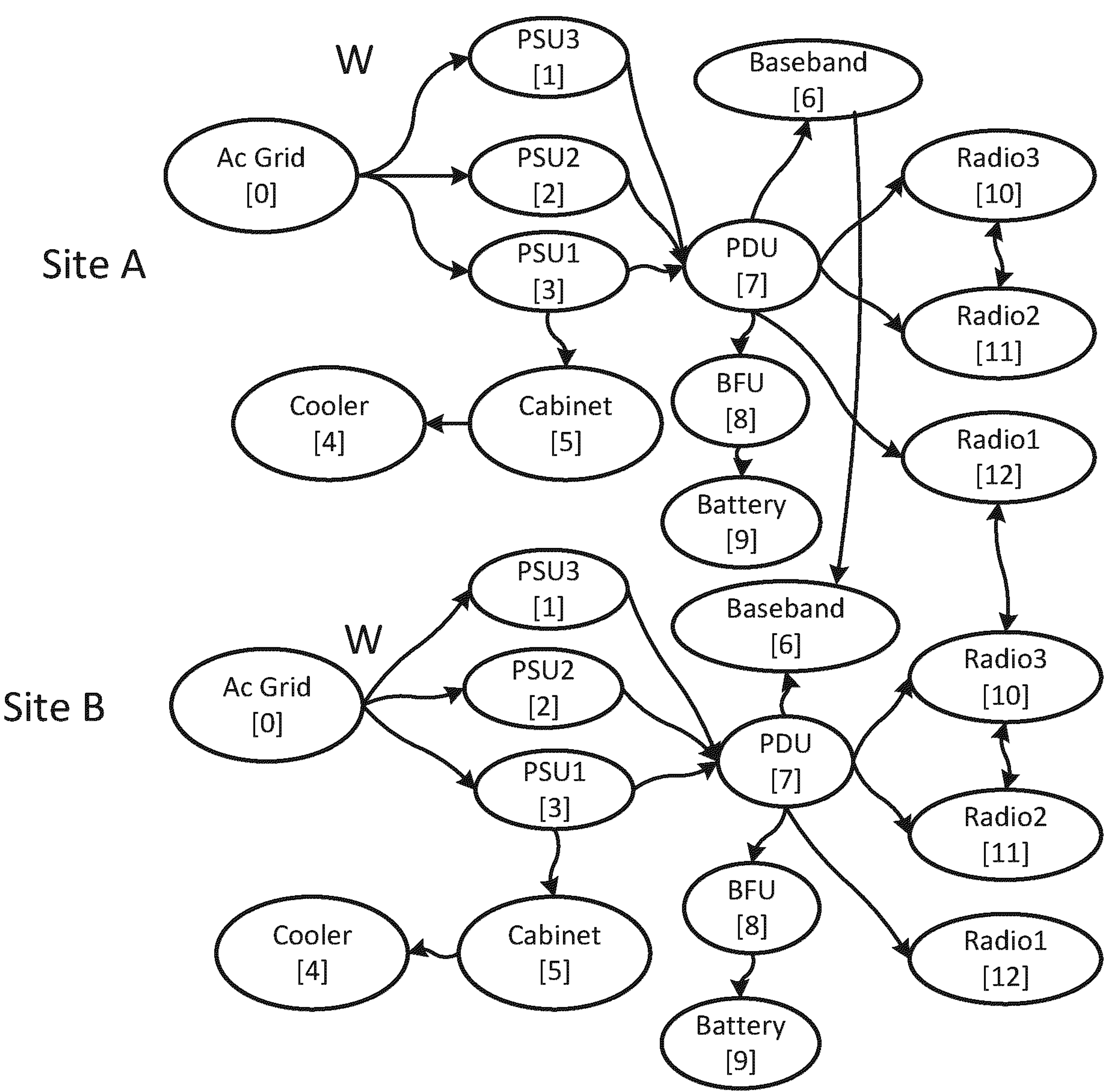

Another example graph representing components in a site is given together with its interactions with other sites is shown in FIG. 5B. In that case, radio units in a site can be inter-dependent. Similar to the relation between different baseband units in different sites, given that the sites may be a virtual radio access network (V-RAN) or a centralized radio access network (C-RAN).

Hierarchical Aggregated Graphs

A graph can also represent a site. After the site has been analyzed and a policy for the site generated, it is possible to calculate a weight of the site and let it be represented as a graph node in an even larger graph of sites. Accordingly, systems/methods described herein may be used to select what site could potentially be shut down to optimize for energy or any other purpose.

The edge weights $W_{x,y}$ (or simply, "weights") may be calculated or estimated based on one or more observed metrics. Potential metrics for compute the weights include OFF to ON or ON to OFF transition parameters (e.g., metadata that is often captured from the hardware specifications). For example, such data may include mean switching on duration (e.g., the time it takes after switch on command until it becomes operational again), and power consumption during transition. The metrics used to calculate the weights may further include ON to OFF transition (metadata that is often captured from the hardware specifications). The metrics used to calculate the weights may further include power consumption of each network element during active state (metadata that may be captured from the hardware specifications), network element priority (i.e. based on how it might affect UE QoS) and/or physical or geographical location of the network element, or component.

Accordingly, in some embodiments, the edge weights are generated based on one or more of on-to-off switching duration, off-to-on switching duration, power consumption during on-to-off transition, power consumption during off-to-on transition, power consumption during active state, network element priority and physical location.

Next, by using the observed metrics, the systems/methods compute the edge weights, and represent all the factors that might be influenced by switching ON/OFF a network element or a hardware component as a function represented by weight matrix, W. Since it is desirable to maintain the Quality of Service (QoS), a function is defined to ensure the policy does not impact/surpass any applicable service level agreement.

QoS metrics can be a plurality of metrics including, at the network layer, packet delay variation, packet loss, packet delay, etc., and at the radio link layer, RSRP, RSRQ, CQI, RSSI, SNR, etc.

Additional network performance management (PM) counters may be extracted from managed objects to trace QoS and SLA as well such as number of active users, number of RRC connections, UE throughput, number of handovers, etc, which describe or relate to the KPI's.

Accordingly, the effect on QoS and energy associated with a source node may be calculated or estimated as a function of the weights associated with the source node as follows:

$$QoS_{source}=f(W_{source,destination}) \quad [2]$$

$$Energy_{source}=f(W_{source,destination}) \quad [3]$$

Other factors/metadata that may be used to calculate QoS and energy are on/off switching times, ($Time_{on,off}$, $Time_{off,on}$), on/off power consumption ($Power_{on,off}$, $Power_{off,on}$), active power consumption ($Power_{active,component}$), Priority:

$$QoS=f(\text{Priority id},KPI\_1,KPI\_2,\ldots) \quad [4]$$

$$Energy=f(Time_{on,off},destination,Power_{on,off},Time_{off,on},Power_{off,on},Power_{active,component}) \quad [5]$$

Some embodiments employ a machine learning technique, such as reinforcement learning, to evaluate a gradient (∇W) which represents the deviation of the QoS or energy with respect to the weights W. The main components under observation consist of energy consumption and a QoS indicator metric, such as KPI's including throughput, latency, packet drop, call drop, etc.

Components/graph nodes for which the gradient is minimized with respect to the QoS may be prioritized to be switched OFF earlier than the others, and similarly, components/graph nodes where the gradient is maximized with respect to energy consumption may be prioritized to switch OFF earlier than others. Therefore, the problem to be solved may be formulated as min-max($\nabla W_{energy}$, $\nabla W_{QoS}$,), or a maximization as depicted in Equation [1] above.

Accordingly, in some embodiments, the edge weights are generated by evaluating a cost function that minimizes an energy consumption metric. In some embodiments, the edge weights are generated by evaluating the cost function that minimizes the energy consumption metric while maintaining a quality of service, QoS, metric above a predetermined threshold. The QoS metric is based on one or more of a service level agreement, a number of active user devices in the communication system, a number of active connections in the communication system, a throughput in the communication system, a number of handovers in the communication system, a number of dropped calls in the communication system, and a number of dropped packets in the communication system.

Some embodiments described herein may be generalized to more complex systems, such as an entire communication network. The turn OFF or sleep mode on one of components (sites, units) may not only affect device lifetime, but may also lead to changes of performance and energy consumption in other areas of the network due to nodes interdependencies. As a result, it may be difficult to design a policy by hand that is optimal for the network as a whole.

Figure 6:
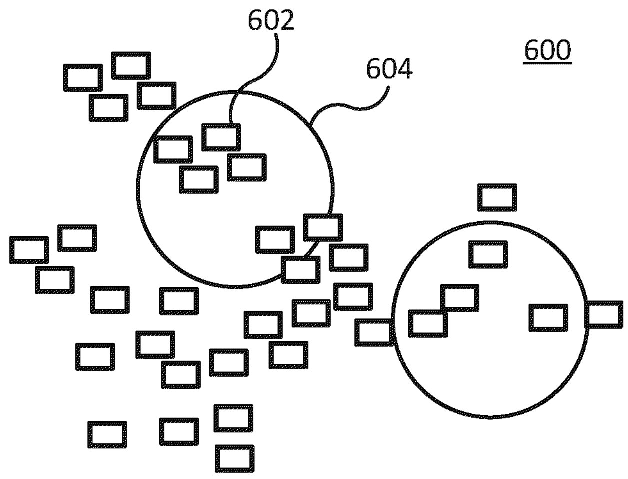
FIG. 6 illustrates a plurality of components in a communication network.

In this regard, network components may be schematically depicted as belonging to local zones. For example, FIG. 6 illustrates a plurality of components 602 in a communication network 600. Some of the components 602 belong to local zones 604. The turnoff or sleep mode on one of components may affect other components that are located in the same local zone. Each local zone 604 can be considered as a part of the whole network 600 as shown in FIG. 6.

In this case, a graph-based method as described herein may be implemented as follows. First, a policy optimization is performed for each component in its local zone. It should be noted that the policy optimization for every component can be distributed over multiple processors. Next, the information for every component is aggregated and summed up. Next, a backward reply from the whole network to each component is evaluated. Finally, the policy optimization for each component is performed by taking into account the backward reply from the whole network. This procedure may be repeated until the convergence to the optimal values for an ON/OFF switching control policy for the entire network. It should be noted that the network can be divided into non-interacting subsystems, for which the policy optimization procedures can be independent.

It will be appreciated that a network can be defined as a macro cell network, and/or a small cell network, that directly interaggregate with the macro cell network.

In a Reinforcement learning (RL) approach, an optimal ON/OFF switching control policy can be obtained via Reinforcement Learning of a policy by an agent, where in this case, the agent is the learning algorithm, and the environment is the problem (which is the 2D graph and associated N×N matrix described above). The action, the new environment state and the corresponding reward are the dynamics which are updated after every action. In other words, an action is executed by the agent, and in return, the environment returns the reward (which is a function of the above-mentioned metrics), together with the new state.

The goal of a reinforcement learning system is to learn a policy, $\pi(a_t, s_t)$, which maximizes a sum of rewards, if one action at a time is executed. Otherwise, i.e., in the case of a multi-arm bandit problem, the same can be formulated with one reward, and hence one reward will be given per action sequence. A reward in this scope is described as the energy saving and QoS (or estimated QoE) improvement.

Accordingly, in some embodiments, the edge weights W that define the policy for controlling a communication system are generated using a reinforcement learning system that measures a reward and a system state in response to operation of a policy for managing power control and adjusts the edge weights in response to the reward the system state. The reward may correspond to an energy saving in the communication system or a Quality of Service, QoS, improvement of the communication system. Once a policy for managing power control has been generated, the communication system may be controlled in accordance with the policy.

Figure 7:
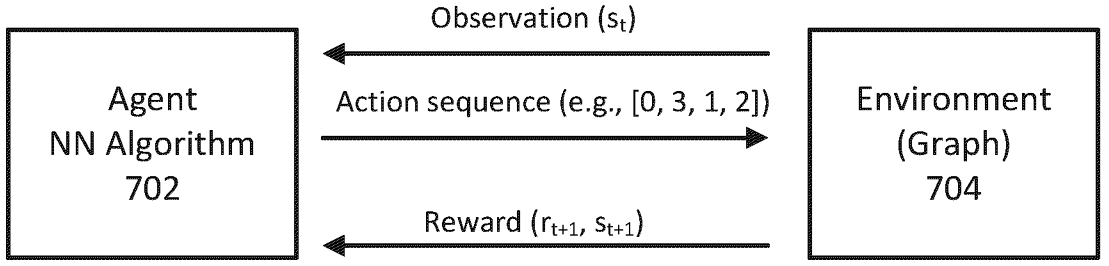
FIG. 7 illustrates training of an agent through reinforcement learning based on a graphical representation of an environment according to some embodiments.

FIG. 7 illustrates a flow diagram of the learning process with respect to OSS actions where inter-dependency in between sites exists. As shown in FIG. 7, an agent, such as a neural network algorithm, 702 observes a state s t of an environment 704 represented by a graph. The agent 702 executes an action sequence, such as a sequential switching ON/OFF of system components according a policy π. The action sequence results in the environment 704 transitioning to a new state $s_{t+1}$ and generating a reward $r_{t+1}$ associated with the new state. The agent algorithm 702 updates the policy based on the new state and reward with a goal of maximizing total rewards. In this case, updating the policy is performed by updating the weights $W_{x,y}$ associated with the source nodes in the graph.

Figure 8:
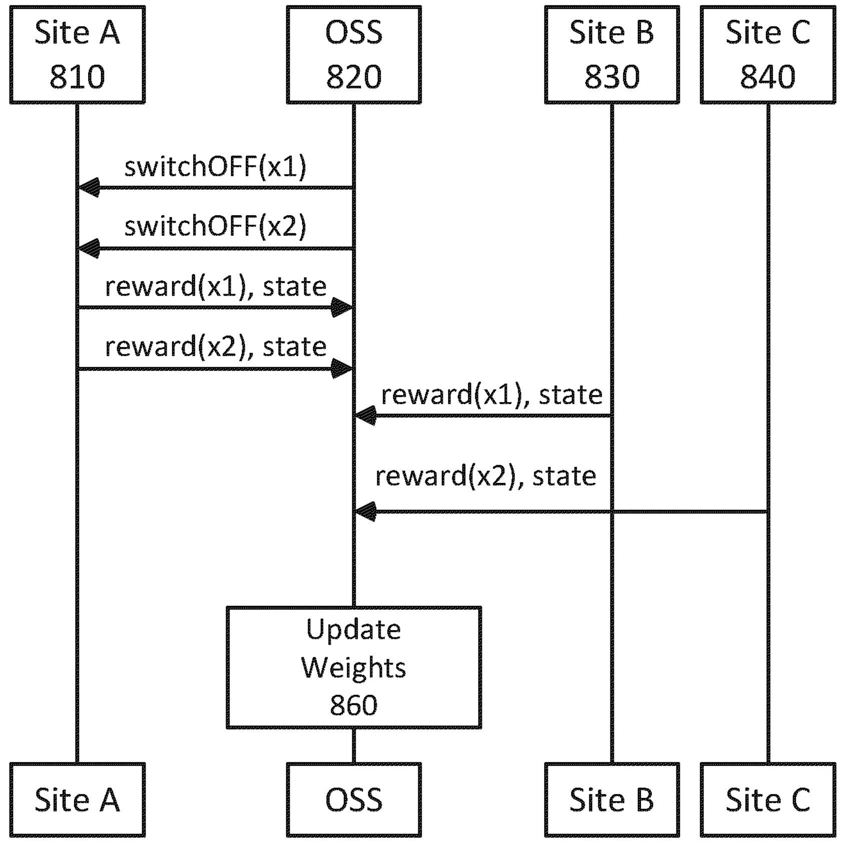
FIG. 8 illustrates example operations for controlling power of elements of a communications system according to some embodiments.

FIG. 8 illustrates an example of a flow diagram of this process for a plurality of sites 810, 830, 840 that are controlled by an OSS node 820. The OSS node 820 generates instructions to switch off components x1 and x2 in Site A 810 in accordance with a policy IT. Site A 810 responds to the OSS node with rewards and new states associated with each component x1, x2. Sites B 830 and C 840 may also be affected by the commands regarding components x1 and x2, and so also provide rewards and states to the OSS in response to the commands. The OSS evaluates the rewards and states and, in response, updates the weights of the graph at block 860, thereby generating a new policy π.

In some embodiments, crash reports may be utilized for training the RL agent: Implementing the actions in real deployment may be risky. Accordingly, some embodiments may train the agent with the stored information on the crash reports. Here it is assumed that the nodes that are intended to be switched OFF had been accidentally OFF and the consequences of them being OFF (observations related to energy, and QoS degradation) are recorded in the crash report. Hence, the action would then be set according to the component ID that crashed and the reward will be set to the resulting QoS and energy degradation.

Maintenance of networks units may also be used for training the agent. Planned maintenance of a unit also allows us to collect a backward reply information from connected units.

Some embodiments learn the edge weights (corresponding to inter-dependencies) of the components using Reinforcement Learning. Hence, the RL agent for the graph computation is expected to be trained at the sites, and then the graphs can be aggregated at a higher layer (such as in OSS). Hence, a system as described herein can be also implemented in a Federated Learning setting in the a remote processor.

FIG. 9A illustrates operations according to some embodiments. Referring to FIG. 9A, systems/methods according to some embodiments generate (902) a graph representation of interdependencies of elements of a communication system, wherein the graph representation comprises graph nodes corresponding to the components of the communication system and edges between pairs of graph nodes representing dependency relationships between the pairs of graph nodes. The systems/methods then generate (904) edge weights for the edges of the graph representation, each edge weight corresponding to a relative importance of the dependency relationship represented by the edge weight, and generate (906) the policy for managing power control by traversing the graph representation of interdependencies. The interdependencies include power switching interdependencies.

The graph representation may be traversed by, for each graph node in the graph representation, generating a sum of edge weights of edges connected to the graph node, selecting graph nodes with a smallest sum of edge weights, removing selected graph nodes from the graph representation, and updating the policy for managing power control with the selected graph nodes.

Figure 9B:
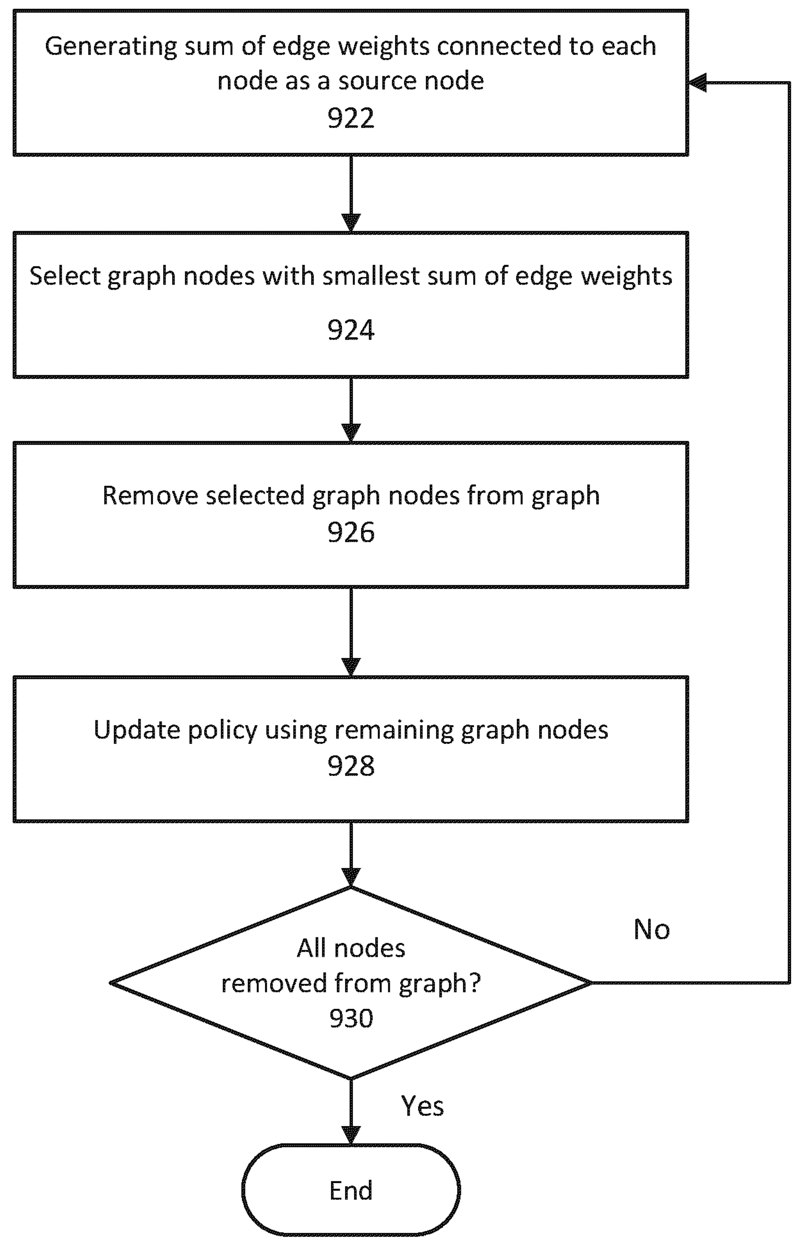

Referring to FIG. 9B, in some embodiments, traversing the graph representation includes repeating steps of: for each graph node in the graph representation, generating a sum of edge weights of edges connected to the graph node as a source node (block 922), selecting graph nodes with a smallest sum of edge weights (block 924), removing selected graph nodes from the graph representation (block 926), and updating the policy for managing power control with the selected graph nodes (block 928), until all graph nodes have been removed from the graph. At block 930, the operations check to see if all graph nodes have been removed from the graph. If so, operations terminate. Otherwise, operations return to block 922, and the sum of edge weights for each remaining node is re-calculated.

Figure 10A:
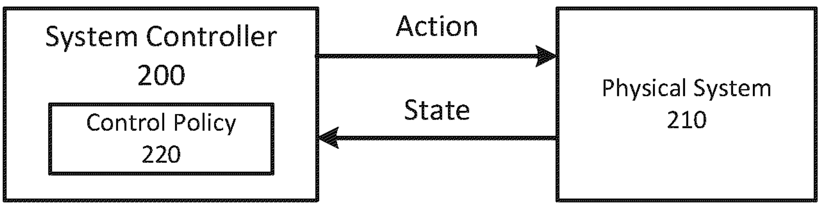
FIG. 10A illustrates a system controller that uses a policy trained through reinforcement learning for controlling a system.

FIG. 10A illustrates a system controller 200 that controls a physical system 210 according to a control policy 220. The system controller observes a state of the physical system 210, and then controls the physical system 210 by causing an action to be taken on the physical system 210. The action 210 is selected by the system controller 200 based on the observed state of the physical system and the control policy 220.

Figure 10B:
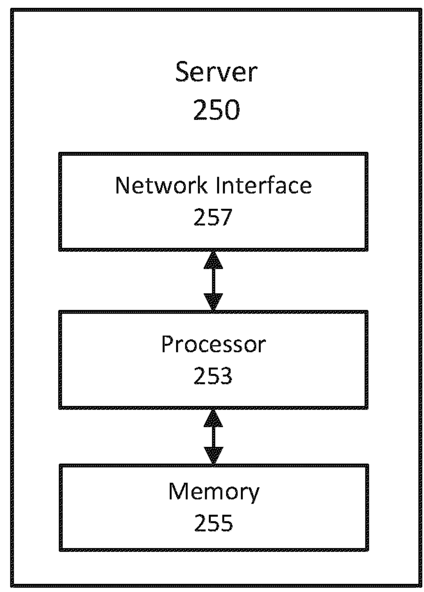
FIG. 10B illustrates a server according to some embodiments.

Referring to FIG. 10B, the control policy 220 may be trained by an agent, such as a server 250. The server 250 includes a processing circuit 253, a network interface 257 coupled to the processing circuit 253 and a memory 255 coupled to the processing circuit 253. Referring to FIGS. 9A and 10B, some embodiments provide a server 250 including a processing circuit 253 and a memory 255 coupled to the processing circuit and comprising computer readable program instructions that, when executed by the processing circuit, cause the server 250 to perform operations of generating (block 902) a graph representation of interdependencies of components of the communication system, wherein the graph representation comprises graph nodes corresponding to the components of the communication system and edges between pairs of graph nodes representing dependency relationships between the pairs of graph nodes, generating (block 904) edge weights for the edges of the graph representation, each edge weight corresponding to a relative importance of the dependency relationship represented by the edge weight, and generating (block 906) the policy for managing power control by traversing the graph representation of interdependencies.

Referring to FIGS. 9A and 10B, some embodiments provide a server 250 that generates (block 902) a graph representation of interdependencies of components of the communication system, wherein the graph representation comprises graph nodes corresponding to the components of the communication system and edges between pairs of graph nodes representing dependency relationships between the pairs of graph nodes. The server 250 generates (block 904) edge weights for the edges of the graph representation corresponding to relative importance of the dependency relationship represented by the edge weight, and generates (block 906) the policy for managing power control by determining an order for switching the components of the communication system on or off based on the edge weights.

Explanations are provided below for abbreviations that are mentioned in the present disclosure.

Abbreviation Explanation

RL Reinforcement Learning
RRL Robust Reinforcement Learning
PPO Proximal Policy Optimization
A3C Asynchronous Advantage Actor Critic
AC Alternating Current
BFU Battery Fuse Unit
CQI, Channel Quality Indicator
KPI Key Performance Indicator
MOS Mean Opinion Score
OSS Operating and Support System
PCB Printed Circuit Board
PSU Power Supply Unit
PDU Power Distribution Unit
RSRP Reference Signal Received Power
RSRQ Reference Signal Received Quality
RSSI Reference Signal State Information
SNR Signal to Noise Ratio
SLA Service Level Agreement
QoE Quality of Experience
QoS Quality of Service
UE User Equipment Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 11:
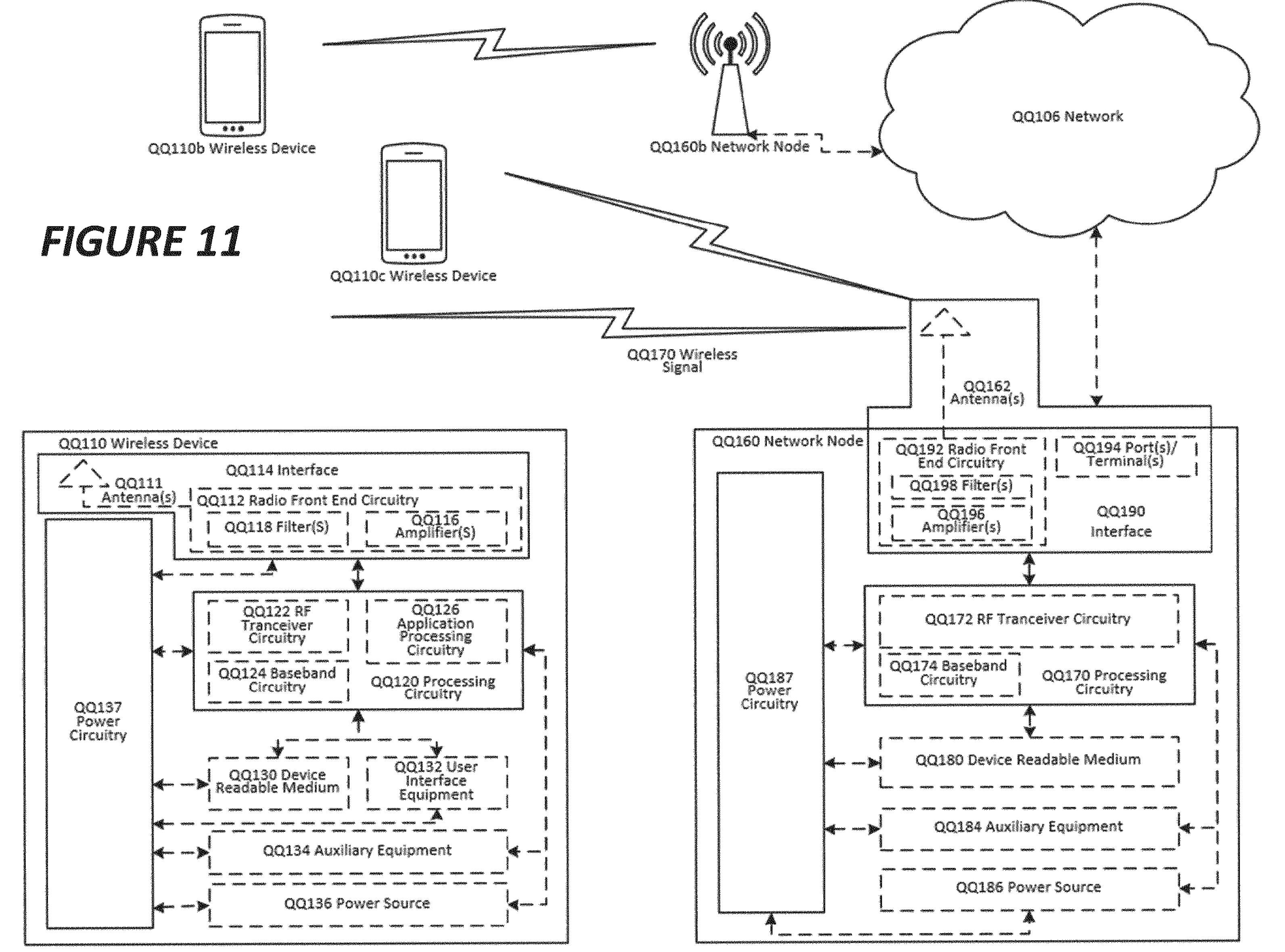
FIG. 11 is a block diagram of a wireless network in accordance with some embodiments.

FIG. 11: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network QQ106, network nodes QQ160 and QQ160*b*, and WDs QQ110, QQ110*b*, and QQ110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signaling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 11 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 12:
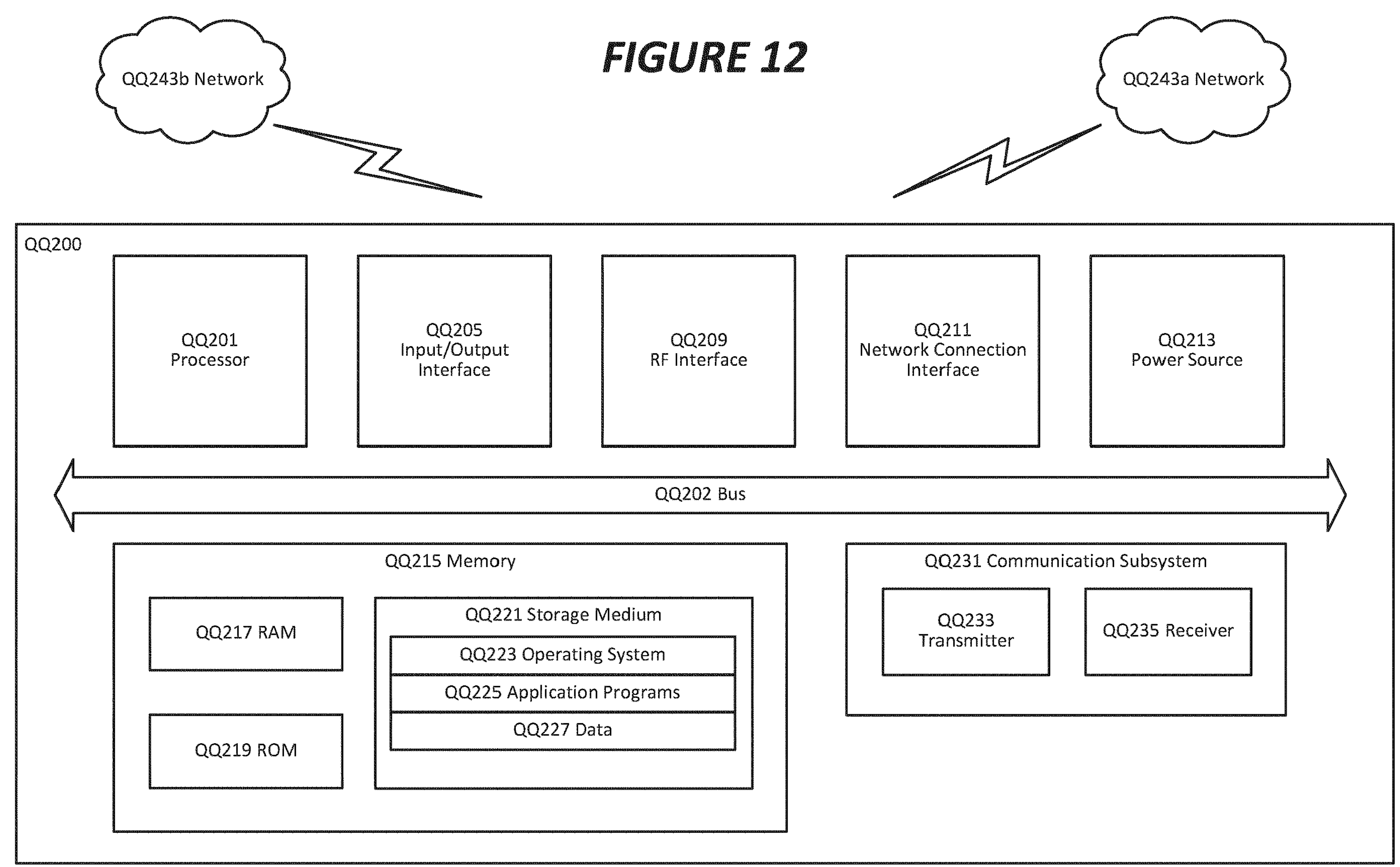
FIG. 12 is a block diagram of a user equipment in accordance with some embodiments.

FIG. 12: User equipment in accordance with some embodiments

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243*a*. Network QQ243*a* may encompass wired and/or wireless networks such as a local-area network (LAN), a wide-area network (WAN), a computer network, a wireless network, a telecommunications network, another like network or any combination thereof. For example, network QQ243*a* may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

FIG. 13: Virtualization environment in accordance with some embodiments

FIG. 13 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 13, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 13.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signaling can be effected with the use of control system QQ3230 which may alternatively be used for communication between the hardware nodes QQ330 and radio units QQ3200.

Figure 14:
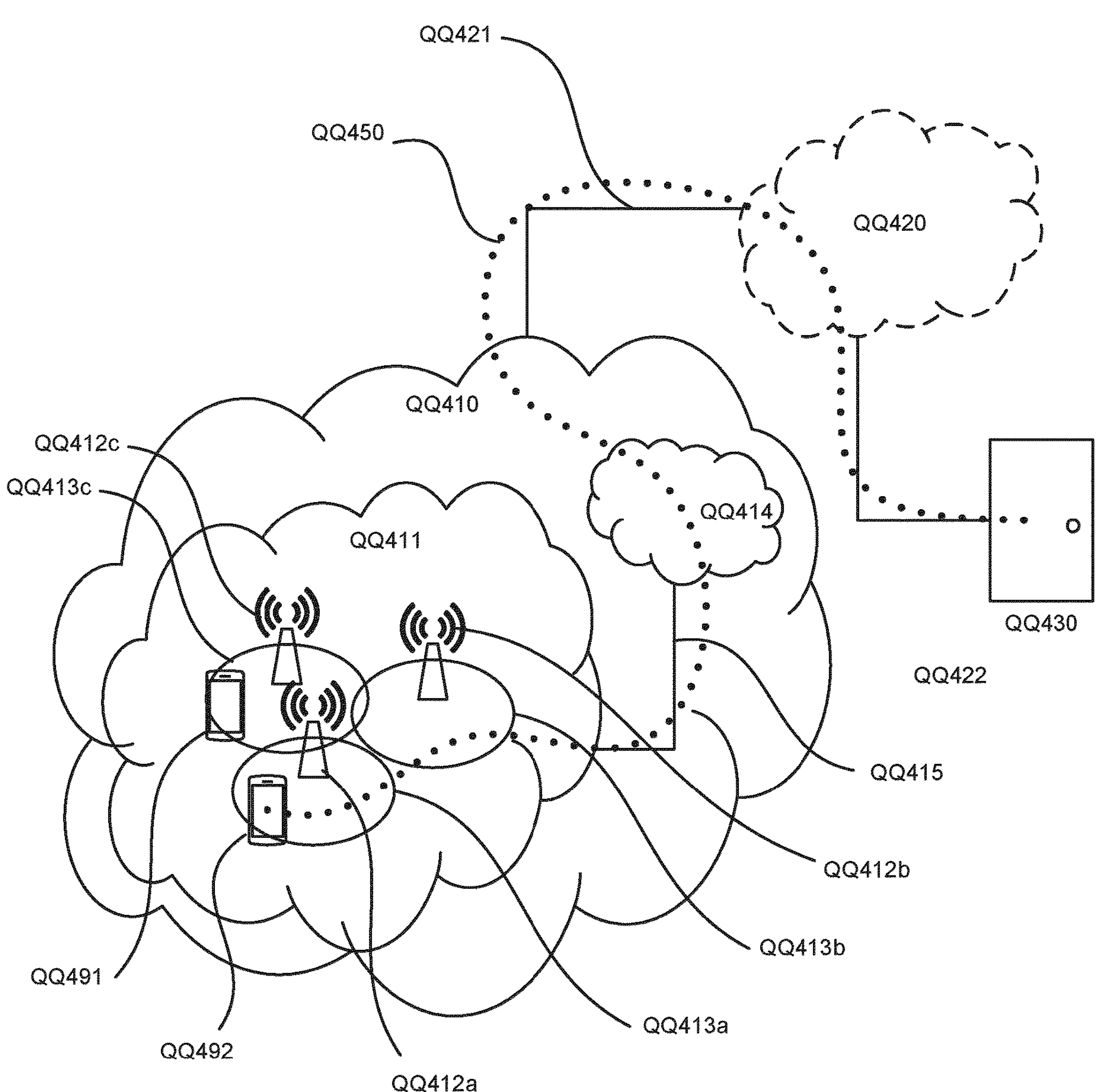
FIG. 14 is a block diagram of a telecommunication network connected via an intermediate network to a host computer in accordance with some embodiments.

FIG. 14: Telecommunication network connected via an intermediate network to a host computer in accordance with some embodiments.

With reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 15:
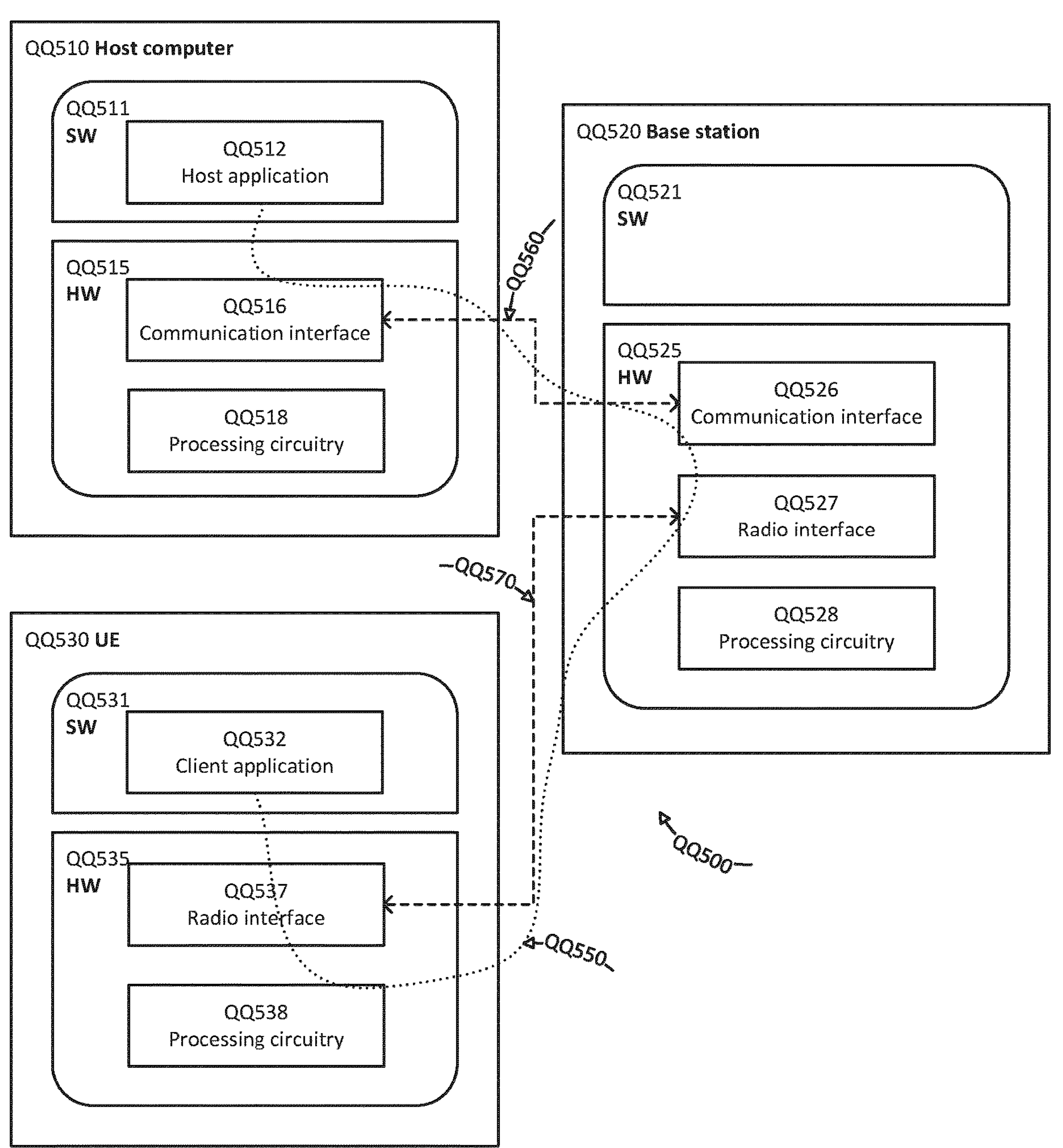
FIG. 15 is a block diagram of a host computer communicating via a base station with a user equipment over a partially wireless connection in accordance with some embodiments.

FIG. 15: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 15. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520. Communication interface QQ526 may be configured to facilitate connection QQ560 to host computer QQ510. Connection QQ560 may be direct or it may pass through a core network (not shown in FIG. 15) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 15 may be similar or identical to host computer QQ430, one of base stations QQ412*a*, QQ412*b*, QQ412*c* and one of UEs QQ491, QQ492 of FIG. 14, respectively. This is to say, the inner workings of these entities may be as shown in FIG. 15 and independently, the surrounding network topology may be that of FIG. 14.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 16:
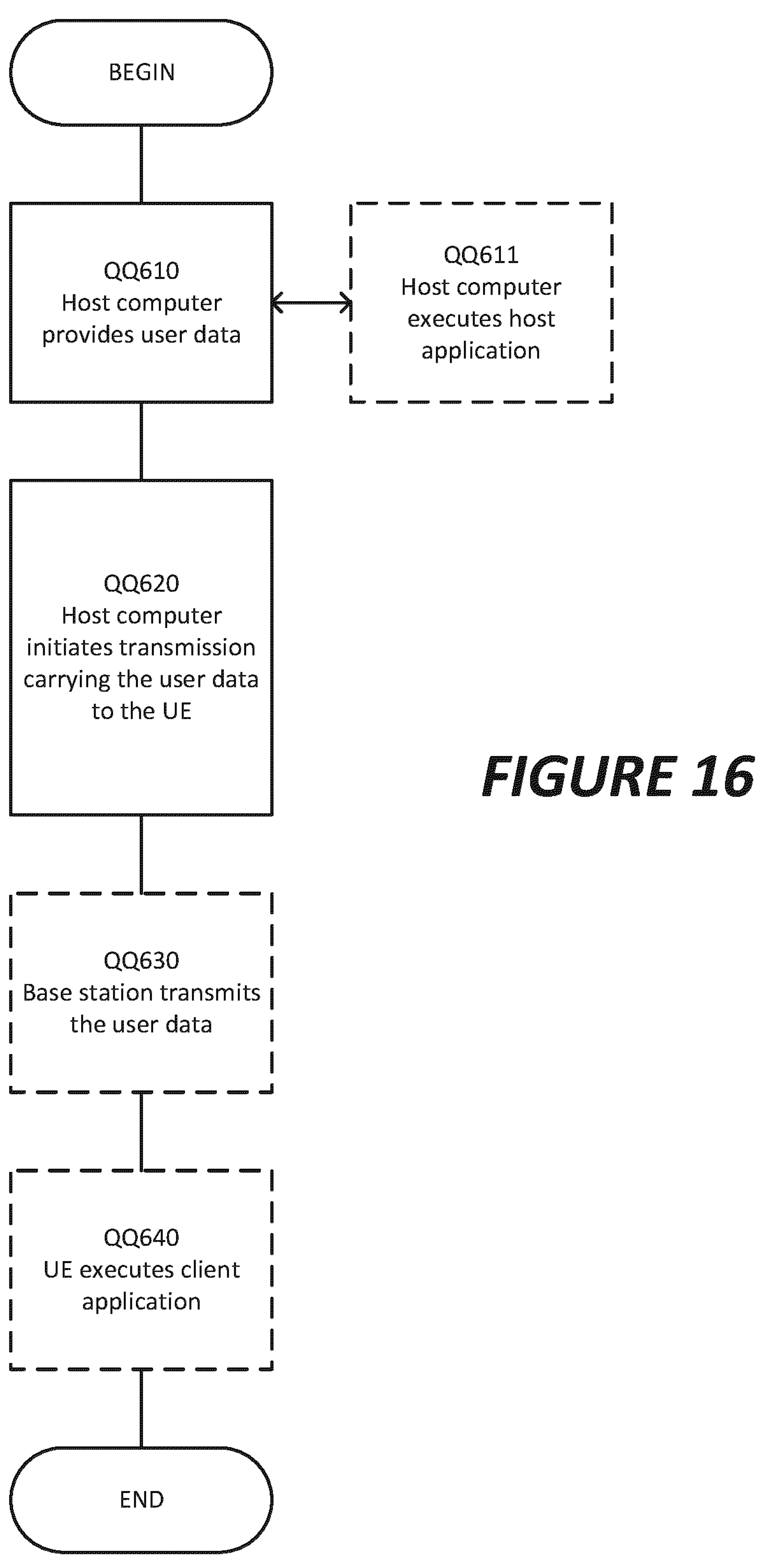
FIG. 16 is a block diagram of methods implemented in a communication system including a host computer, a base station, and a user equipment in accordance with some embodiments.

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 17:
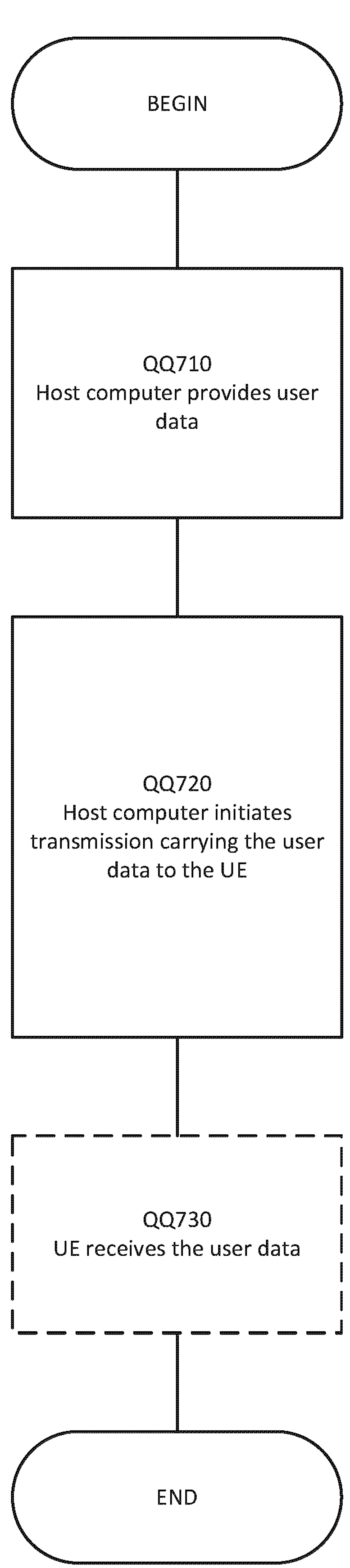
FIG. 17 is a block diagram of methods implemented in a communication system including a host computer, a base station, and a user equipment in accordance with some embodiments.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 18:
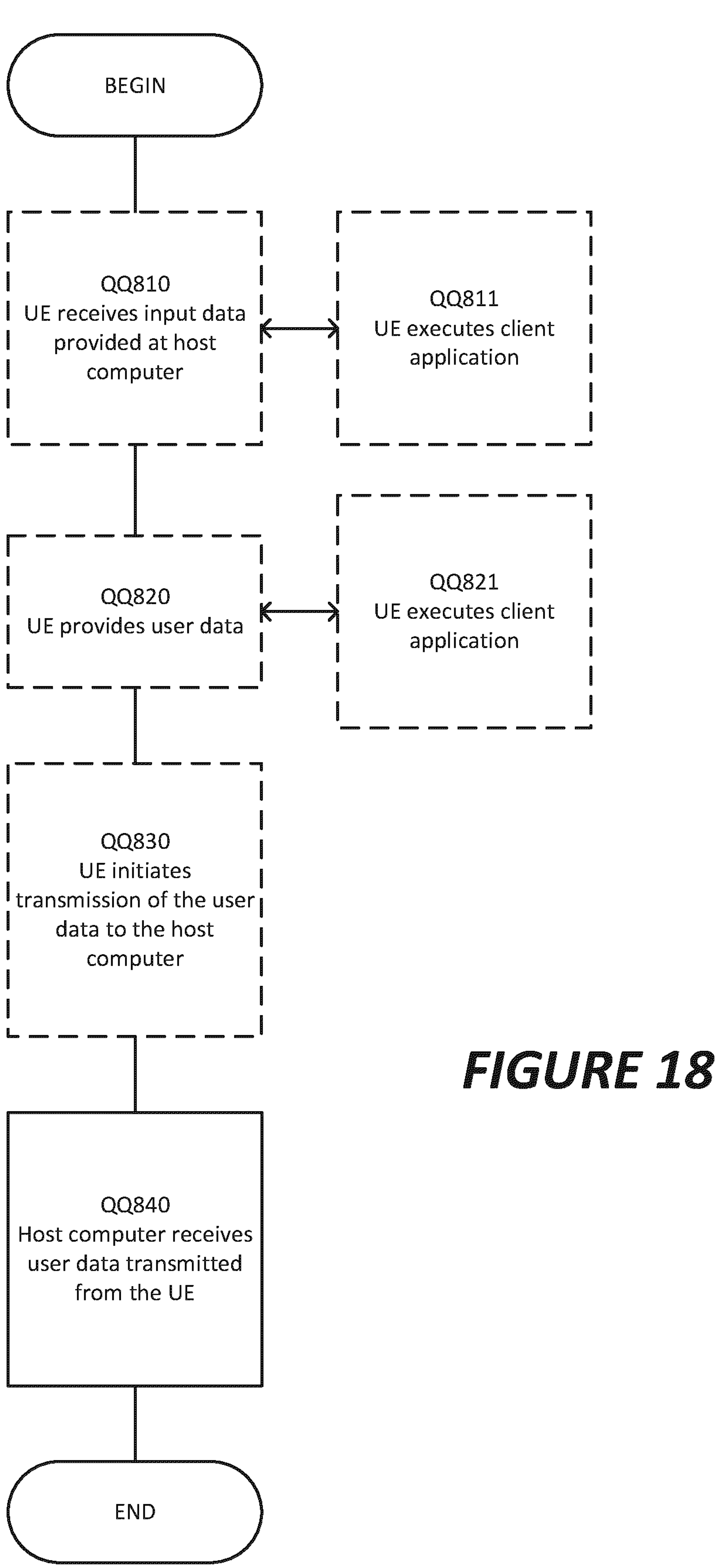
FIG. 18 is a block diagram of methods implemented in a communication system including a host computer, a base station, and a user equipment in accordance with some embodiments.

FIG. 18: Methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 19:
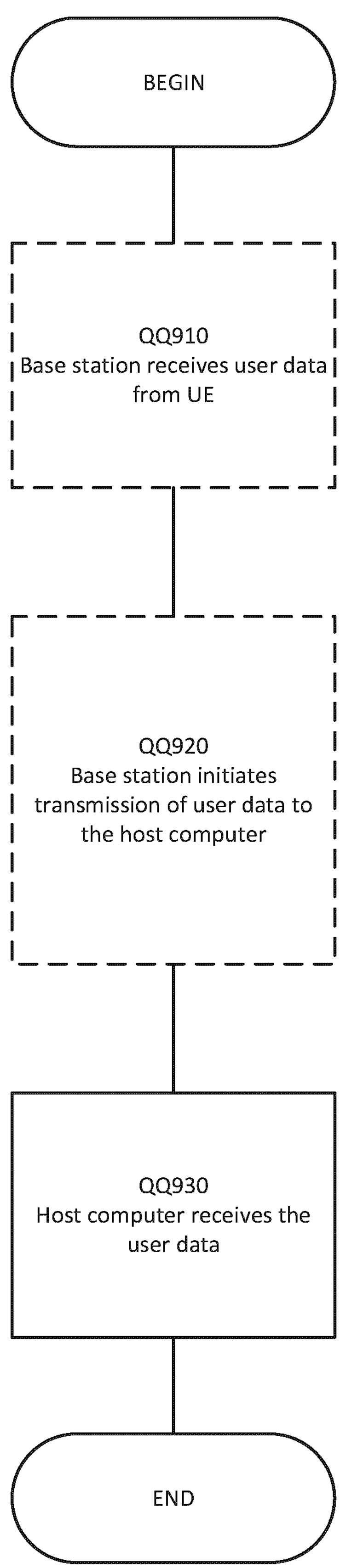
FIG. 19 is a block diagram of methods implemented in a communication system including a host computer, a base station, and a user equipment in accordance with some embodiments.

FIG. 19: Methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

What is claimed is:

1. A computer implemented method for managing power control in a communication system, comprising:

generating a graph representation of interdependencies of components of the communication system, wherein the graph representation comprises graph nodes corresponding to the components of the communication system and edges between pairs of graph nodes representing dependency relationships between the pairs of graph nodes;

generating edge weights for the edges of the graph representation, the edge weight of an edge corresponding to a relative importance of the dependency relationship represented by the edge; and generating a policy for managing power control by determining an order for switching components represented by the graph nodes on or off based on the edge weights.

2. The method of claim 1, wherein determining the order for switching components represented by the graph nodes on or off comprises:

for each graph node in the graph representation, generating a sum of edge weights of edges connected to the graph node;

selecting graph nodes with a smallest sum of edge weights;

removing selected graph nodes from the graph representation; and updating the policy for managing power control with the selected graph nodes.

3. The method of claim 1, wherein determining the order for switching components represented by the graph nodes on or off comprises:

repeating steps of:

for each graph node in the graph representation, generating a sum of edge weights of edges connected to the graph node; and selecting graph nodes with a smallest sum of edge weights;

removing selected graph nodes from the graph representation; and updating the policy for managing power control with the selected graph nodes until all nodes have been removed from the graph.

4. The method of claim 1, wherein the edge weights are generated based on one or more of:

on-to-off switching duration, off-to-on switching duration, power consumption during on-to-off transition, power consumption during off-to-on transition, power consumption during active state, network element priority and physical location.

5. The method of claim 1, wherein generating the edge weights comprises evaluating a cost function that minimizes an energy consumption metric.

6. The method of claim 5, wherein generating the edge weights comprises evaluating the cost function that minimizes the energy consumption metric while maintaining a quality of service, QoS, metric above a predetermined threshold.

7. The method of claim 1, wherein generating the edge weights comprises evaluating a cost function that maximizes a quality of service, QoS, metric.

8. The method of claim 7, wherein generating the edge weights comprises evaluating the cost function that maximizes the QoS metric while maintaining an energy consumption metric below a predetermined threshold.

9. The method of claim 7, wherein the QoS metric is based on one or more of a service level agreement, a number of active user devices in the communication system, a number of active connections in the communication system, a throughput in the communication system, a number of handovers in the communication system, a number of dropped calls in the communication system, and a number of dropped packets in the communication system.

10. The method of claim 1, wherein generating the edge weights comprises generating the edge weights using a reinforcement learning system that measures a reward and a system state in response to operation of a policy for managing power control and adjusts the edge weights in response to the reward the system state.

11. The method of claim 10, wherein the edge weights are selected based on maximizing a sum of the rewards received in response to operation of the policy for managing power control.

12. The method of claim 10, wherein the reward corresponds to an energy saving in the communication system or a Quality of Service, QoS, improvement of the communication system.

13. The method of claim 1, further comprising controlling the communication system in accordance with the policy for managing power control.

14. The method of claim 13, wherein controlling the communication system comprises switching components of the system on or off in accordance with the policy.

15. The method of claim 1, wherein the interdependencies comprise power switching interdependencies.

16. The method of claim 1, wherein the communication system comprises a wireless communication system.

17. The method of claim 1, wherein the components of the communication system comprise one or more communication equipment, base stations, base station components, cells, sites, switches, antennas, processors, and radios.

18. A server, comprising:

a processing circuit; and a memory coupled to the processing circuit and comprising computer readable program instructions that, when executed by the processing circuit, cause the server to:

generate a graph representation of interdependencies of components of the communication system, wherein the graph representation comprises nodes corresponding to the components of the communication system and edges between pairs of nodes representing dependency relationships between the pairs of nodes;

generate edge weights for the edges of the graph representation, each edge weight corresponding to a relative importance of the dependency relationship represented by the edge weight; and generate a policy for managing power control by determining the order for switching components represented by the graph nodes on or off based on the edge weights.

* * * * *